United States Patent
Levsen

(10) Patent No.: US 7,896,729 B2
(45) Date of Patent: Mar. 1, 2011

(54) UNIVERSAL ROTARY BLADE HOLDER FOR SHARPENER

(75) Inventor: Clark A. Levsen, Shawnee, KS (US)

(73) Assignee: Hantover, Inc., Kansas City, MO (US)

( * ) Notice: Subject to any disclaimer, the term of this patent is extended or adjusted under 35 U.S.C. 154(b) by 667 days.

(21) Appl. No.: 11/857,266

(22) Filed: Sep. 18, 2007

(65) Prior Publication Data

US 2009/0075570 A1    Mar. 19, 2009

(51) Int. Cl.
*B24B 1/00*    (2006.01)

(52) U.S. Cl. ........... 451/193; 451/45; 451/234; 451/293; 451/367

(58) Field of Classification Search .................. 279/121, 279/123, 124; 451/45, 51, 193, 234, 293, 451/367, 379
See application file for complete search history.

(56) References Cited

U.S. PATENT DOCUMENTS 5,084,976 A * 2/1992 Ross ........................... 30/276
5,667,427 A   9/1997 Airhart et al.

OTHER PUBLICATIONS

Exhibit—photographs of prior art rotary blade sharpener and single rotary blade holder (photographs taken Apr. 20, 2007).
Exhibit B—photographs of prior art multiple blade holders (photographs taken Apr. 20, 2007).
Printout from Bettcher Website (printed Aug. 2, 2007).

* cited by examiner

*Primary Examiner* — Timothy V Eley
(74) *Attorney, Agent, or Firm* — Hovey Williams LLP

(57) ABSTRACT

A blade-sharpening machine for sharpening any one of various sizes of rotary blades comprises a drive unit and a universal blade chuck for holding the blade to be sharpened. The drive unit further includes a sharpening assembly that sharpens the blade while the drive unit rotates the blade chuck. The blade chuck includes a chassis and jaws that are circumferentially spaced about the chassis and are shiftably attached thereto for securing the rotary blade. A spring-loaded fastener normally urges the jaws radially inwardly into engagement with the blade. A centrally-positioned cam is operable to shift the jaws simultaneously so that the blade can be selectively secured on the blade chuck.

24 Claims, 12 Drawing Sheets

UNIVERSAL ROTARY BLADE HOLDER FOR SHARPENER

BACKGROUND

1. Field

The present invention relates generally to blade sharpening devices. More specifically, embodiments of the present invention concern a blade sharpening machine that accommodates various sizes of rotary blades for sharpening.

2. Discussion of Prior Art

Powered rotary knives having a rotating annular blade are used in the meat processing industry for dressing an animal carcass. The process of dressing the carcass normally involves the removal of meat and fat from various bones as well as cutting of various bones. Rotary knifes enable workers to perform this process with much greater efficiency than with traditional, unpowered knives because the annular blade is spun at very high rotational speeds. Consequently, blades quickly dull during use and must be sharpened periodically. Powered blade sharpeners for sharpening annular blades are also known in the art. Powered blade sharpeners are used to sharpen annular blades during the blade manufacturing process and to sharpen blades that have dulled from use.

However, prior art rotary blade sharpeners are problematic and suffer from certain limitations. For example, prior art sharpeners require multiple blade holders for accommodating a range of blade sizes. Blade holders in the prior art are also problematic in that installation and removal of blades is slow and inefficient. These problems are further aggravated by the severity of blade wear that is common in the industry. In order to avoid production down-time, processors must keep a large supply of blades on hand as well as invest significant capital in purchasing and maintaining numerous blade holders and powered sharpeners. Accordingly, there is a need for an improved rotary blade sharpener that does not suffer from these problems and limitations.

SUMMARY

The present invention provides a universal blade sharpener that does not suffer from the problems and limitations of the prior art sharpeners set forth above.

A first aspect of the present invention concerns a universal blade-holding chuck operable to be rotatably driven by a blade-sharpening drive having an adjustable blade sharpener. The universal blade-holding chuck is configured to securely hold any one of multiple variously sized circular blades while being sharpened by the adjustable blade sharpener. The universal blade-holding chuck broadly includes a chassis, a plurality of discrete blade-holding jaws, a jaw-positioning element, and a spring mechanism. The chassis is operable to be rotated by the drive and is rotatable about a rotation axis. The plurality of discrete blade-holding jaws are circumferentially positioned about the rotation axis and slidably coupled relative to the chassis for sliding movement in a radial direction relative to the rotation axis. The jaw-positioning element is shiftably mounted relative to the chassis. The jaw-positioning element is operably coupled with each of the plurality of discrete blade-holding jaws to shift the jaws simultaneously along the radial direction when the jaw-positioning element is shifted relative to the chassis. The jaws cooperatively present a plurality of concentrically arranged blade-retaining sections, with each of the sections being configured to engage a respective one of the circular blades. The spring mechanism interconnects the chassis and the plurality of discrete blade-holding jaws to urge the jaws in the radial direction and into engagement with the blade held during sharpening.

A second aspect of the present invention concerns a universal blade-sharpening machine operable to securely hold and sharpen any one of multiple variously sized circular blades. The universal blade-sharpening machine broadly includes a blade-sharpening drive and a universal blade-holding chuck. The blade-sharpening drive has an adjustable blade sharpener. The universal blade-holding chuck is rotatably powered by the drive and configured to securely hold the blade that is held during sharpening by the adjustable blade sharpener. The universal blade-holding chuck includes a chassis, a plurality of discrete blade-holding jaws, a jaw-positioning element, and a spring mechanism. The chassis is drivingly connected with the drive and is rotatable about a rotation axis. The plurality of discrete blade-holding jaws are circumferentially positioned about the rotation axis and slidably coupled relative to the chassis for sliding movement in a radial direction relative to the rotation axis. The jaw-positioning element is shiftably mounted relative to the chassis. The jaw-positioning element is operably coupled with each of the plurality of discrete blade-holding jaws to shift the jaws simultaneously along the radial direction when the jaw-positioning element is shifted relative to the chassis. The jaws cooperatively present a plurality of concentrically arranged blade-retaining sections, with each of the sections being configured to engage a respective one of the circular blades. The spring mechanism interconnects the chassis and the plurality of discrete blade-holding jaws to urge the jaws in the radial direction and into engagement with the blade held during sharpening.

A third aspect of the present invention concerns a universal blade-holding chuck operable to be rotatably driven by a blade-sharpening drive having an adjustable blade sharpener. The universal blade-holding chuck is configured to securely hold any one of multiple variously sized circular blades while being sharpened by the adjustable blade sharpener. The universal blade-holding chuck broadly includes a chassis, a plurality of discrete blade-holding jaws, and a cam. The chassis is operable to be rotated by the drive and is rotatable about a rotation axis. The plurality of discrete blade-holding jaws are circumferentially positioned about the rotation axis and slidably coupled relative to the chassis for sliding movement in a radial direction relative to the rotation axis. The jaws cooperatively present a plurality of concentrically arranged blade-retaining sections, with each of the sections being configured to engage a respective one of the circular blades. The cam is shiftably mounted relative to the chassis and presents a radially outwardly facing cam surface. The jaws each present radially inwardly facing follower surfaces that engage the cam surface, with cam movement relative to the chassis causing progressive radial movement of the jaws.

A fourth aspect of the present invention concerns a universal blade-sharpening machine operable to securely hold and sharpen any one of multiple variously sized circular blades. The universal blade-sharpening machine broadly includes a blade-sharpening drive and a universal blade-holding chuck. The blade-sharpening drive has an adjustable blade sharpener. The universal blade-holding chuck is rotatably powered by the drive and configured to securely hold the blade that is held during sharpening by the adjustable blade sharpener. The universal blade-holding chuck includes a chassis, a plurality of discrete blade-holding jaws, and a cam. The chassis is drivingly connected with the drive and is rotatable about a rotation axis. The plurality of discrete blade-holding jaws is circumferentially positioned about the rotation axis and slidably coupled relative to the chassis for sliding movement in a radial direction relative to the rotation axis. The jaws cooperatively present a plurality of concentrically arranged blade-retaining sections, with each of the sections being configured to engage a respective one of the circular blades. The cam is shiftably mounted relative to the chassis and presents a radially outwardly facing cam surface. The jaws each present radially inwardly facing follower surfaces that engage the cam surface, with cam movement relative to the chassis causing progressive radial movement of the jaws.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 1:
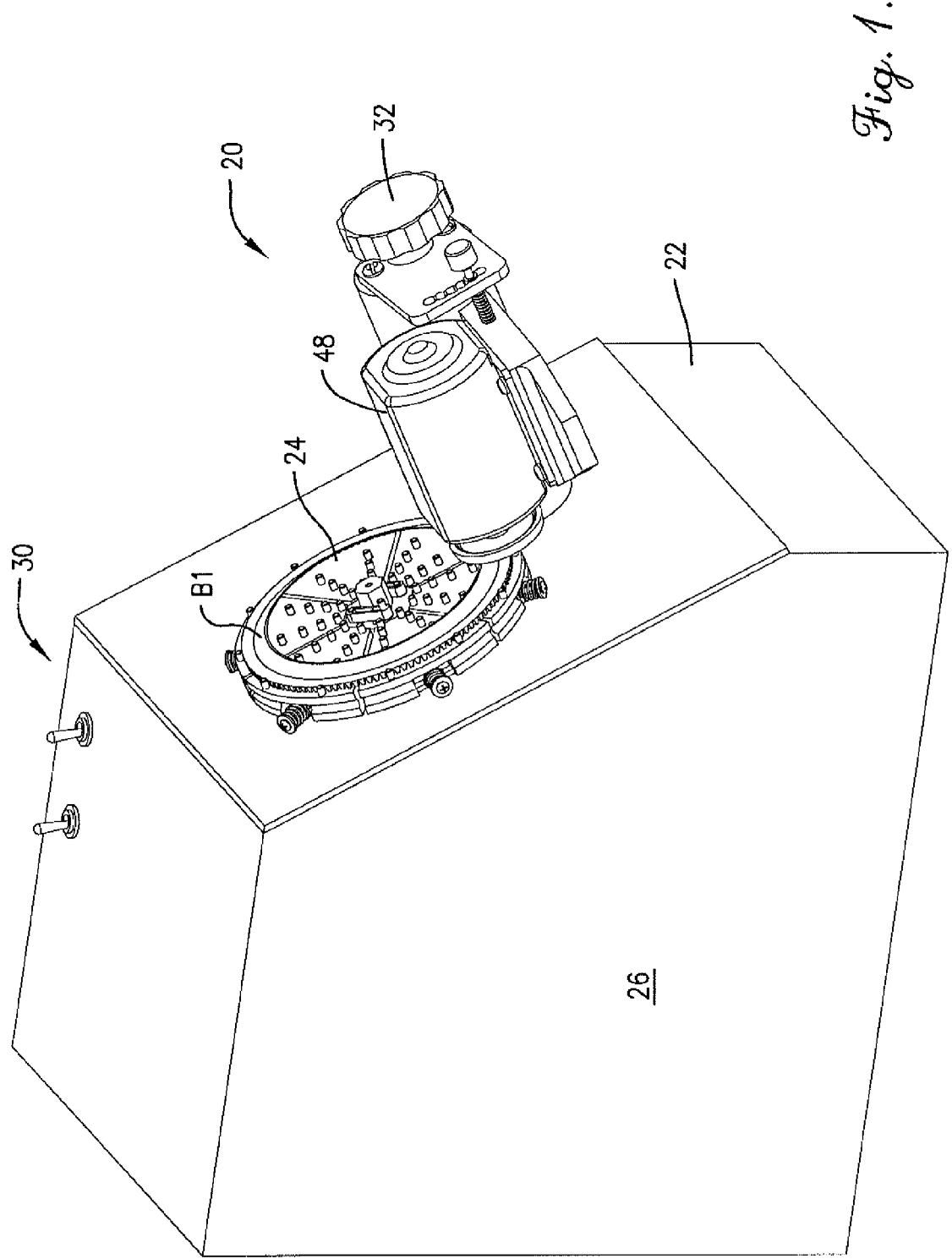
FIG. 1 is a perspective view of a blade-sharpening machine constructed in accordance with a first preferred embodiment of the present invention.
Figure 2:
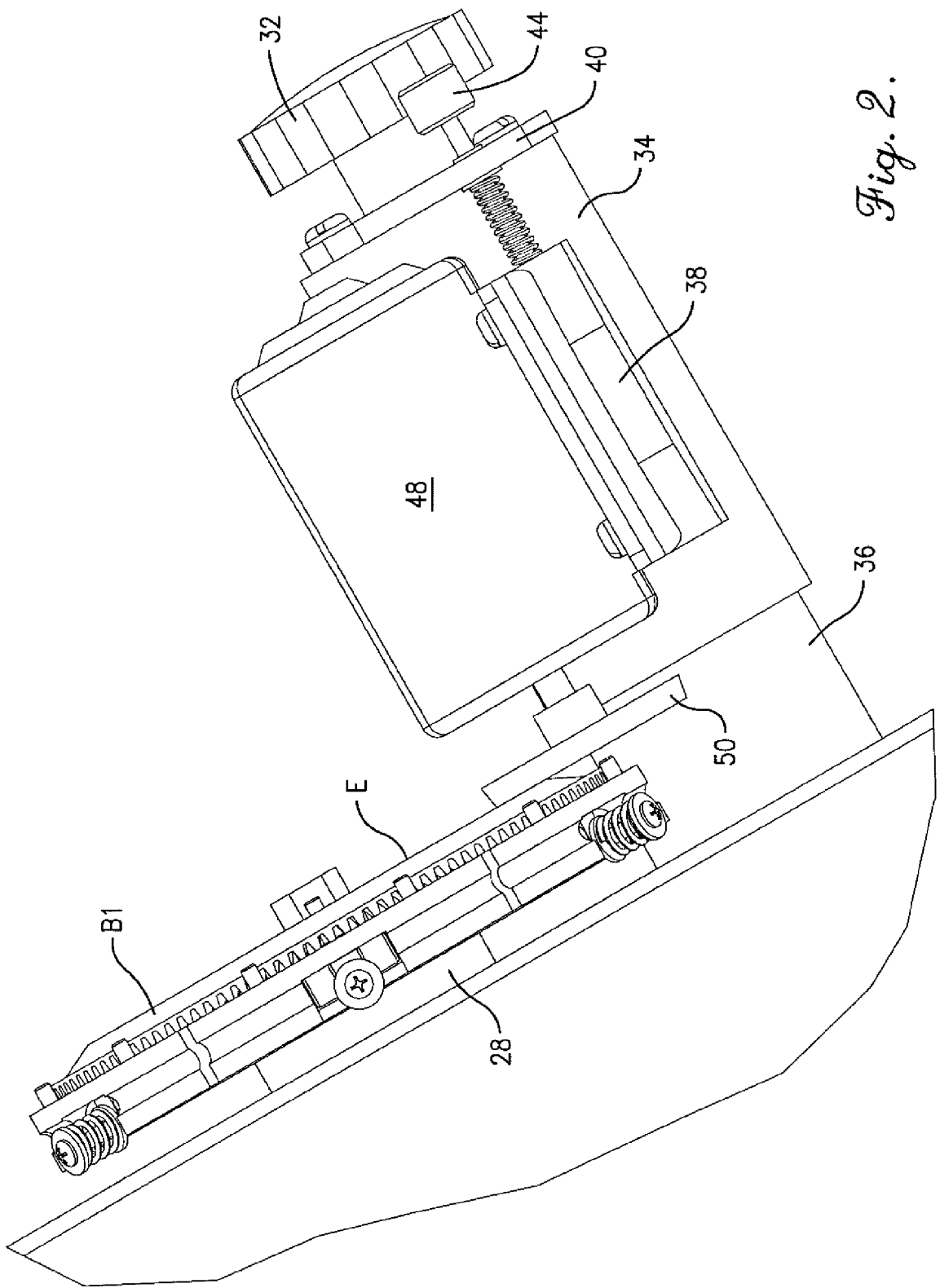
FIG. 2 is an enlarged fragmentary elevation view of the blade-sharpening machine as shown in FIG. 1, showing an annular blade mounted on a blade-holding chuck, with the chuck being rotatably mounted on the blade sharpening drive, wherein a grinding wheel of the drive is pivoted into a blade-sharpening position.
Figure 3:
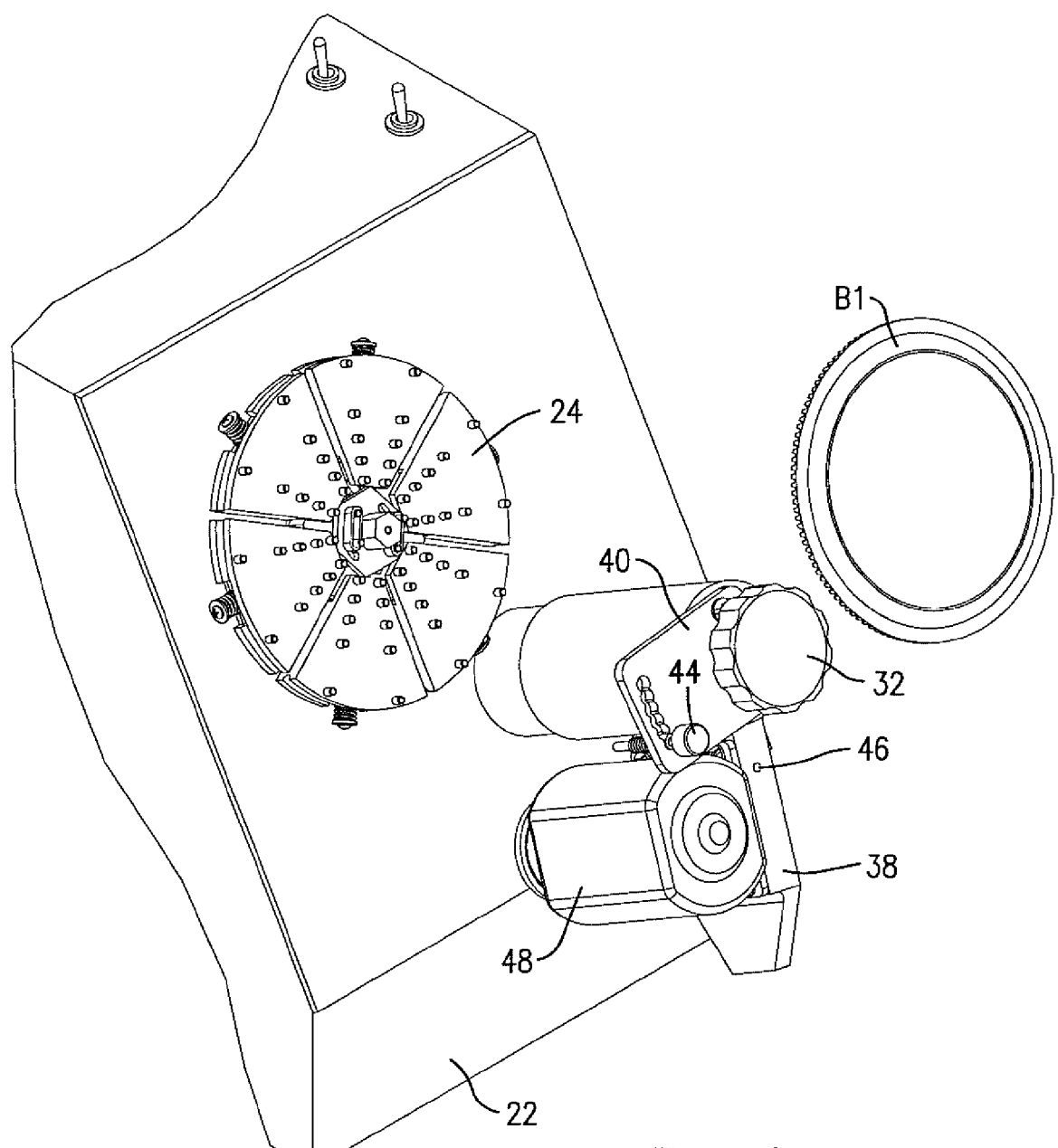
FIG. 3 is a fragmentary perspective view of the blade-sharpening machine as shown in FIGS. 1 and 2, showing the chuck in a blade-releasing condition and the annular blade removed from the chuck, with the grinding wheel pivoted out of the blade-sharpening position.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 4:
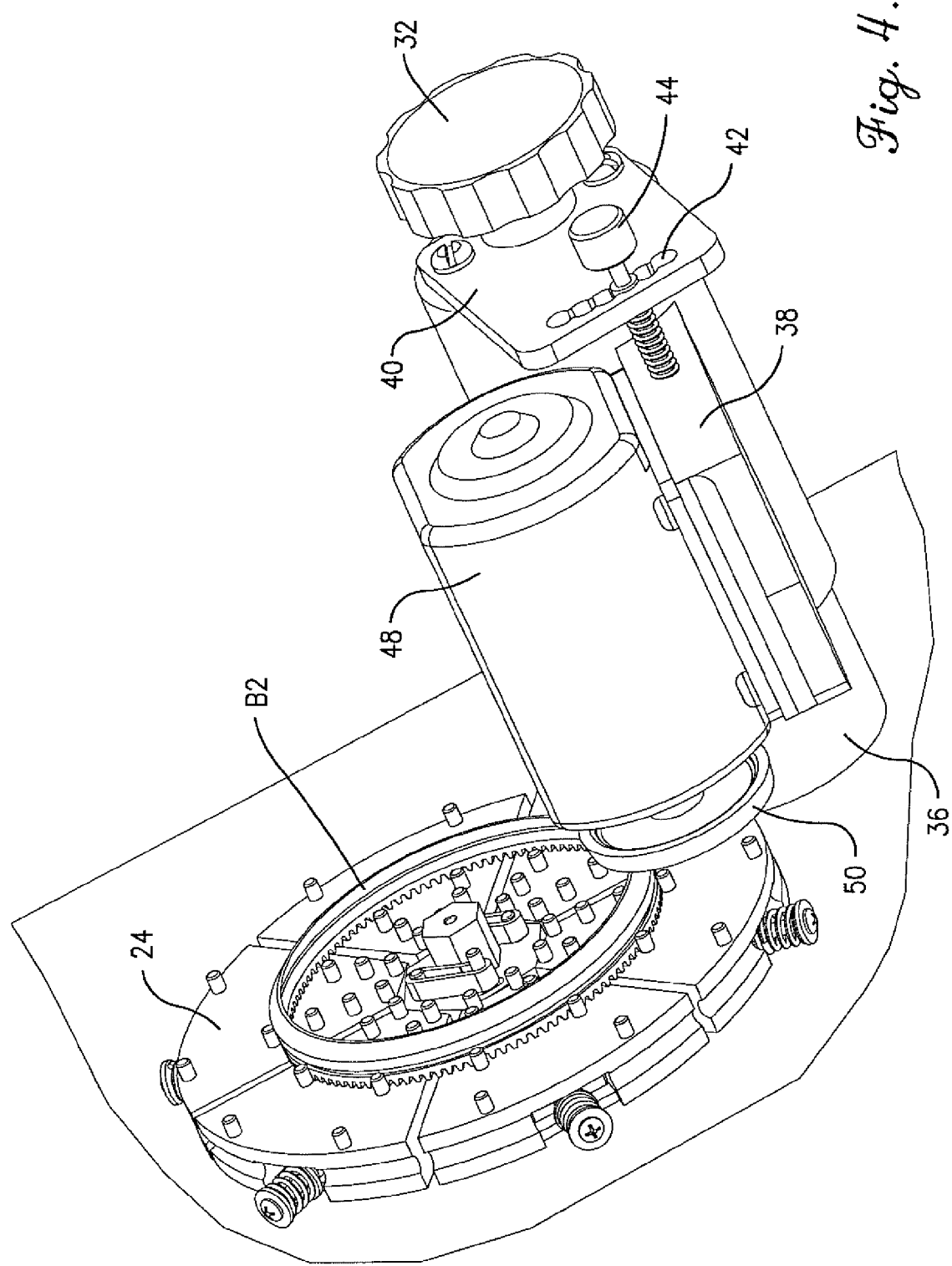
FIG. 4 is a fragmentary perspective view of the blade-sharpening machine as shown in FIGS. 1-3, showing another blade installed in the chuck, with the chuck in a blade-securing condition, and with the grinding wheel pivoted into the blade-sharpening position.

Turning initially to FIG. 1, a blade-sharpening machine 20 is operable to sharpen an endless blade B1. The endless blade B1 is used in a powered knife (not shown) for meat processing in general. Various features of the preferred blade B1 as well as other preferred features of the powered knife are disclosed in U.S. patent application Ser. No. 11/423,266, filed Jun. 9, 2006, entitled ROTARY KNIFE WITH BLADE BUSHING, and in U.S. patent application Ser. No. 11/839,382, filed Aug. 15, 2007, entitled ROTARY KNIFE WITH BLADE BUSHING, both of which are hereby incorporated by reference herein. While the illustrated blade-sharpening machine 20 is preferably configured for sharpening the blade B1, various other blade shapes can be accommodated, such as alternative endless blade B2 (see FIG. 4) which presents an alternative blade profile. Other types of blades, e.g., an annular blade that presents a pair of ends or a blade including a plurality of discrete blade sections, could be sharpened by the illustrated machine 20 without departing from the scope of the present invention. The illustrated blade-sharpening machine 20 broadly includes a drive unit 22 and a universal blade chuck 24.

Turning to FIGS. 1-4, the drive unit 22 includes, among other things, a substantially rigid base 26 and a rotatable platform 28 that supports the blade chuck 24. As will be discussed further, the drive unit 22 is operable to rotate the blade chuck 24 with a blade secured therein to sharpen the blade. The platform 28 is rotatably driven by a motor (not shown) mounted within the base 26 to rotate relative to the base 26. One of the controls 30 is electrically connected to the motor to turn the motor on and off in the usual manner.

The drive unit 22 further includes a sharpening assembly 32 mounted on the base 26 adjacent to the platform 28. The sharpening assembly 32 is operable to sharpen the blades B1,B2 and includes an adjustable stanchion 34 attached to the base 26. The stanchion 34 includes an adjustable post 36 and an arm 38 that pivots about the post 36. A bracket 40 is attached to an end of the post 36 and presents a slot 42. The bracket 40 secures the arm 38 relative to the post 36 by extending a pin 44 through the slot 42 and into engagement with a hole 46 presented by the arm 38. The sharpening assembly 32 also includes a motor 48 attached to the arm 38 and a grinding wheel 50 drivingly attached to the motor 48.

The sharpening assembly 32 is configured for positioning the grinding wheel 50 relative to the blade chuck 24. Specifically, the height of the grinding wheel 50 relative to the platform 28 is adjusted by adjusting the height of the post 36. The grinding wheel 50 is also preferably pivotal about the post 36 between either a blade-attachment position (see FIG. 3) or a blade sharpening position (see FIGS. 1, 2, and 4). However, it is also within the ambit of the present invention where the sharpening assembly 32 is alternatively configured so that the grinding wheel 50 is otherwise shiftable relative to the base 26, e.g., where the grinding wheel 50 is slidable relative to the base 26. Another one of the controls 30 is electrically connected to the motor 48 and is operable to turn the motor 48 on and off in the usual manner. While the illustrated drive unit 22 is preferred, it will be appreciated that the illustrated drive unit 22 could be variously configured without departing from the scope of the present invention.

Turning to FIGS. 5-10, the blade chuck 24 broadly includes a chassis 52, shiftable jaws 54, and a central cam 56. As will be discussed in greater detail, the inventive blade chuck 24 is universal, i.e., the blade chuck 24 is operable to secure various sizes of annular blades that would commonly be used by a rotary knife. The chassis 52 includes a hub 58 and integrally formed spokes 60 that project radially from the hub 58. The chassis 52 preferably presents oppositely facing upper and lower sides 62,64. The hub 58 presents edges 66 that cooperatively form a hexagonal shape. However, it is consistent with the principles of the present invention where the edges 66 cooperatively present an alternative geometrical shape, such as a circular, triangular, square, pentagonal, or octagonal form. Each of the spokes 60 preferably extend from a corresponding one of the edges 66 and present opposite edges 68. The lower side 64 presents a circular pocket 70 that receives the platform 28. The hub 58 presents countersunk holes 72 that intersect the sides 62,64, with a countersunk end of the holes intersecting the upper side 62. The chassis 52 further includes a central pin 74 attached to the hub 58 and projecting from the upper side 62, with the central pin 74 defining a hub axis. The chassis also includes a pair of offset pins 76 that also project from the upper side 62 and are spaced oppositely from the central pin 74.

The chassis 52 preferably includes six (6) spokes 60, with each being associated with a corresponding one of the edges 66. But it is also within the ambit of the present invention where the chassis 52 includes a smaller or greater number of spokes 60. For example, the hub 58 could include five (5) edges 66 and the chassis 52 could include five (5) spokes 60 that extend from respective ones of the edges 66. The principles of the present invention are also applicable where the number of spokes 60 is different from the number of edges 66, e.g., where there are two spokes 60 per edge 66, or where the chassis 52 is otherwise configured to shiftably support the jaws 54.

The chassis 52 further includes pins 78 that are attached to the spokes 60, with the pins 78 projecting laterally from respective ones of the edges 68. The chassis 52 also includes cylindrical rollers 80 that are each rotatably received on a corresponding one of the pins 78. As will be discussed in greater detail, the pins 78 and rollers 80 serve to slidably mount the jaws 54 onto the chassis 52.

Again, the chassis 52 is preferably releasably attached to the platform 28. Specifically, a pair of flat-head screws 82 are preferably inserted into respective ones of the countersunk holes 72 and threaded into holes 84 presented by the platform 28 (see FIG. 10). But it is also within the ambit of the present invention where the chassis 52 is fixed to the platform 28. With the chassis 52 attached to the platform 28, the hub axis preferably defines a rotation axis about which the blade chuck 24 rotates. But it is also within the ambit of the present invention where the rotation axis is alternatively located relative to the hub axis.

Figure 5:
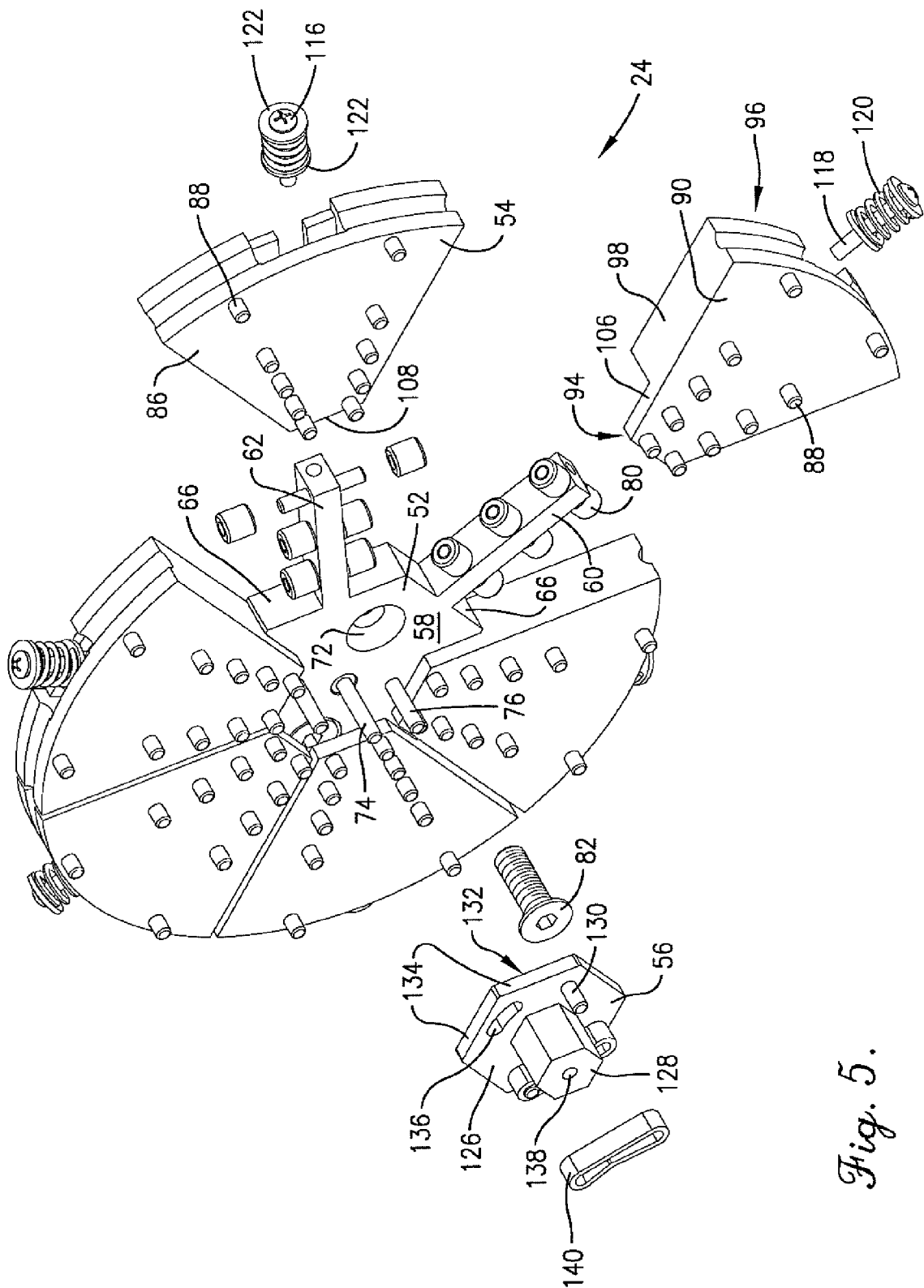
FIG. 5 is a partly exploded perspective view of the blade-holding chuck as shown in FIGS. 1-4, showing a chassis, adjustable jaws, cam, and spring-loaded fastener assemblies of the chuck.
Figure 7:
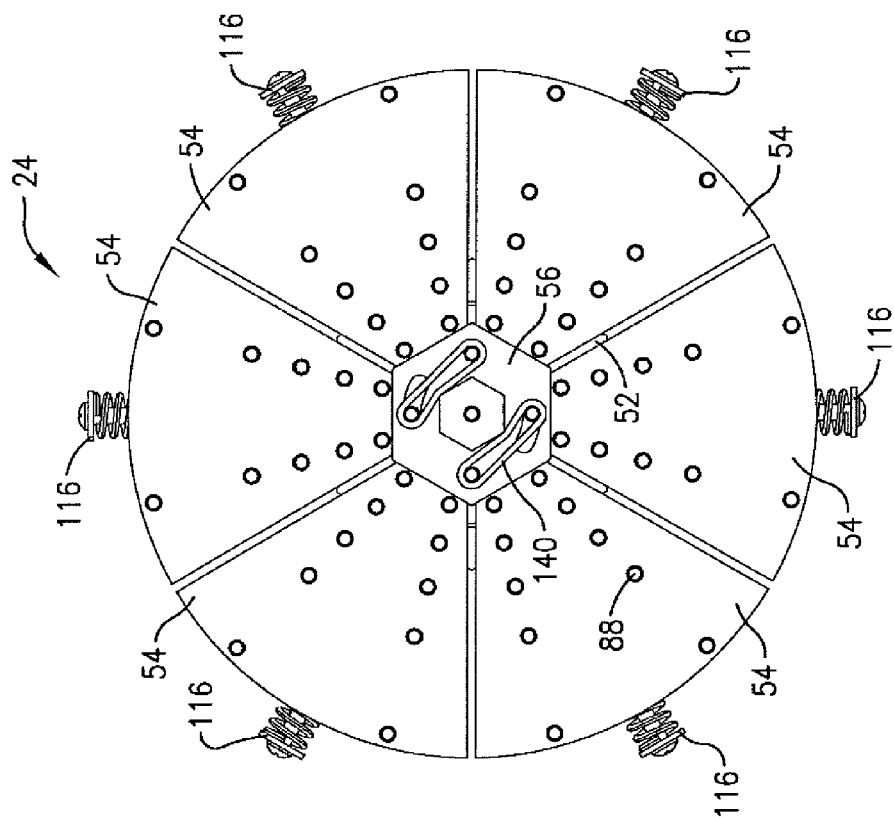
FIG. 7 is a top view of the blade-holding chuck as shown in FIGS. 1-6, showing the chuck in another blade-securing condition.
Figure 6:
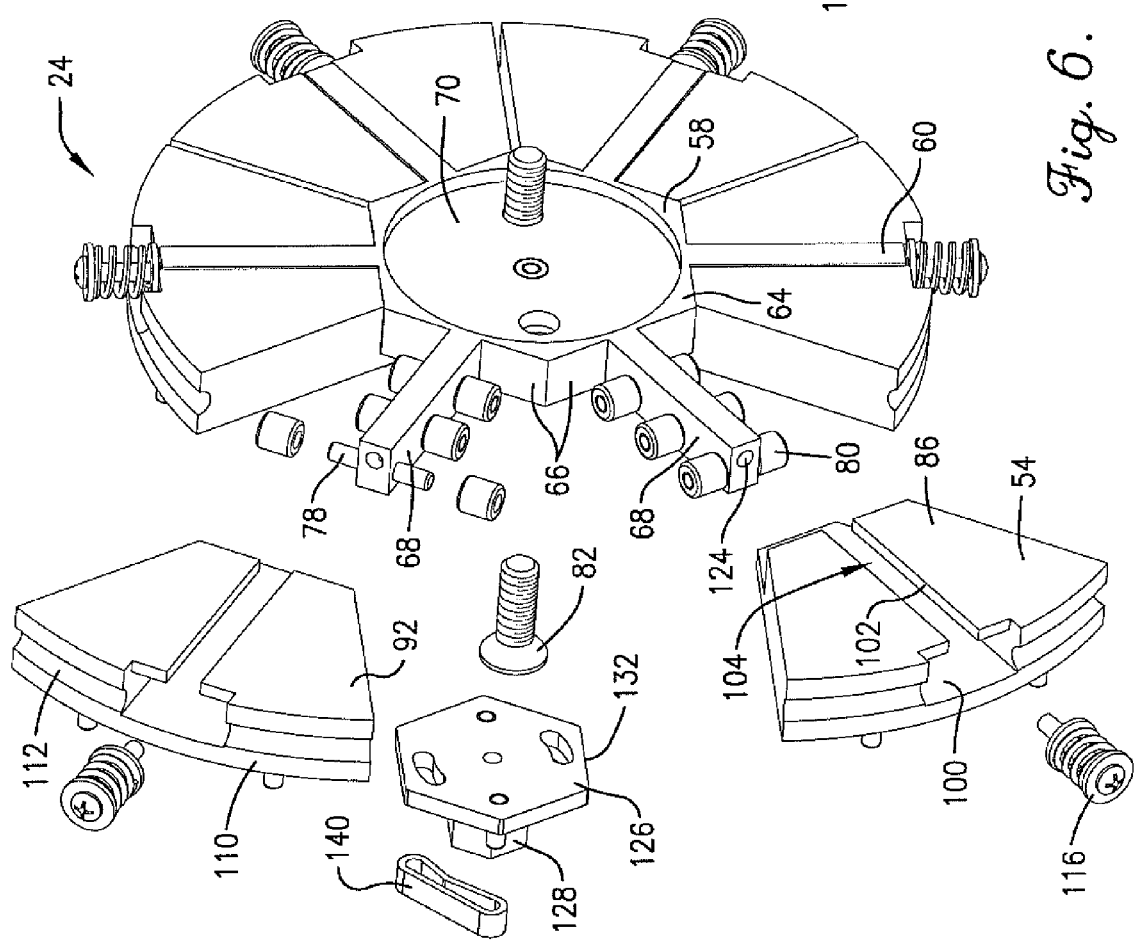
FIG. 6 is an underneath partly exploded perspective view of the blade-holding chuck as shown in FIGS. 1-5.
Figure 9:
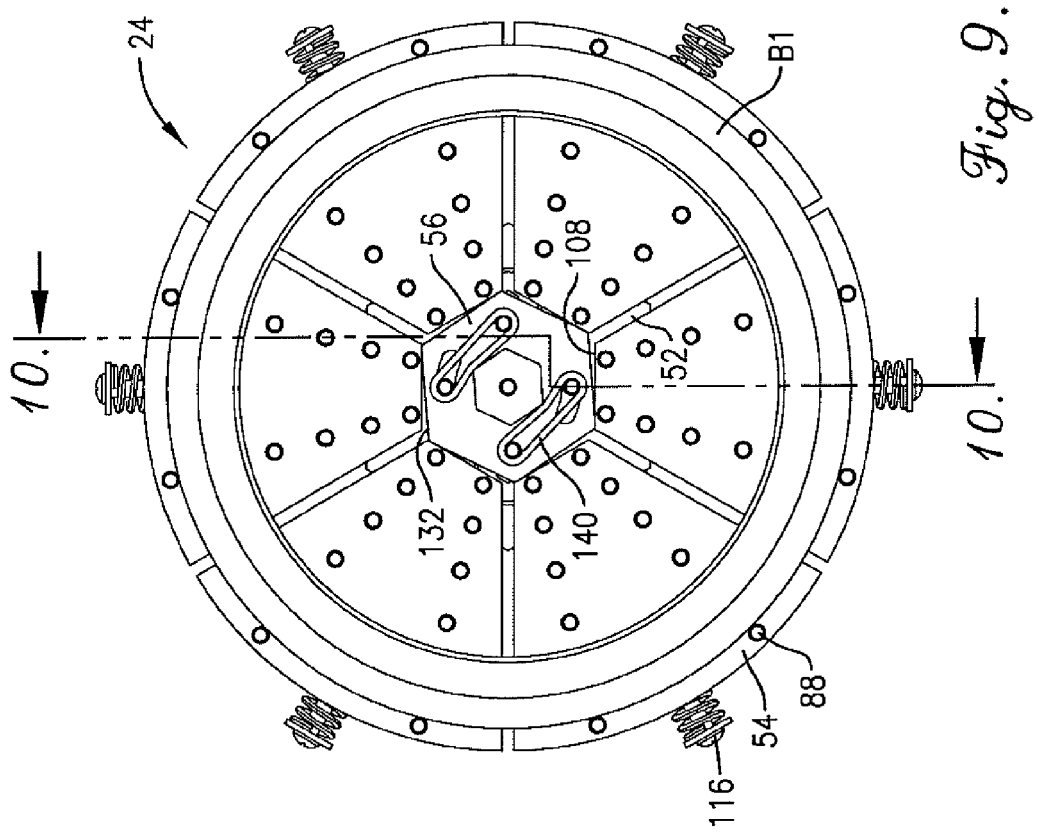
FIG. 9 is a top view of the blade-holding chuck and annular blade as shown in FIGS. 1-4 and 8, showing the blade resting on the chuck with the chuck in the blade-securing condition, with the jaws including blade holding elements that cooperatively form concentric blade-retaining sections of the chuck, and with a radially outermost one of the blade-retaining sections securing the blade.
Figure 8:
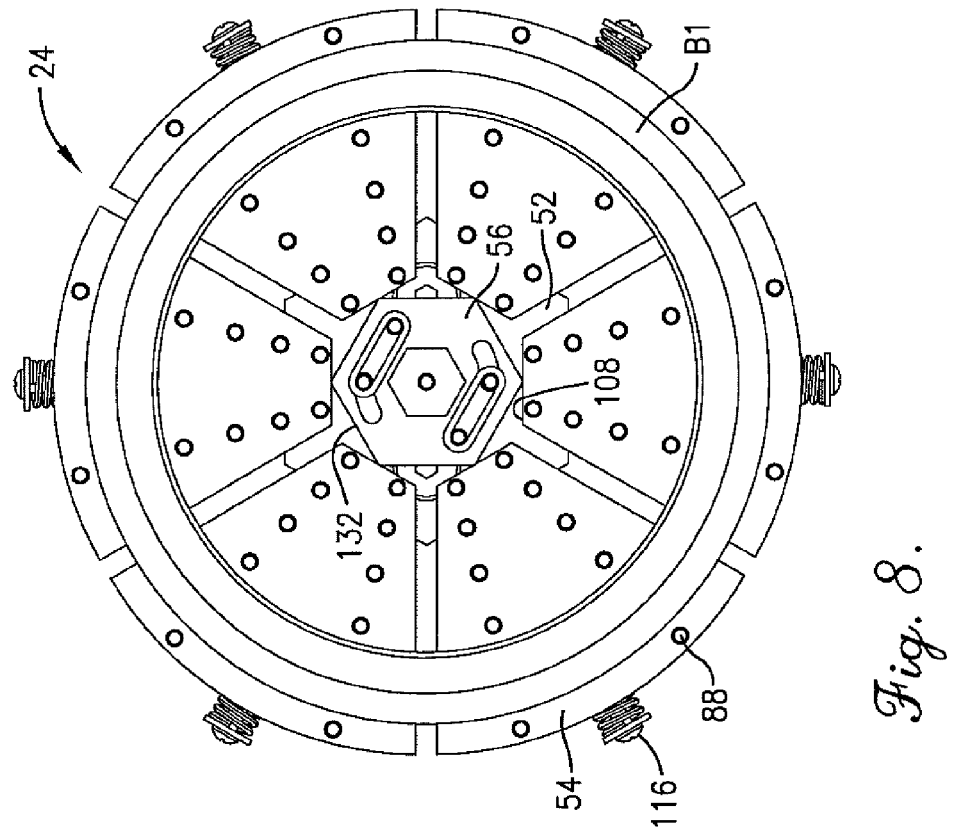
FIG. 8 is a top view of the blade-holding chuck and annular blade as shown in FIGS. 1-4, showing the blade resting on the chuck with the chuck in the blade-releasing condition.

Turning to FIGS. 5 and 6, the shiftable jaw 54 includes a wedge-shaped body 86 and locating bosses 88 attached to the body 86. The body 86 presents opposite upper and lower sides 90,92, proximal and distal ends 94,96, and side edges 98. The body 86 is preferably unitary and presents an axially extending slot 100 that bisects the lower side 92 and extends between the ends 94,96, with retainer portions 102 extending axially to partly cover the slot 100 and present a narrow open face 104 of the slot 100. The upper side 90 is preferably substantially planar to receive the blades B1,B2 as will be discussed. But the principles of the present invention are applicable where the upper side 90 is non-planar, e.g., concave.

Adjacent the proximal end 94, the body 86 presents an overhang portion 106 that projects axially from a remainder of the body 86 and includes a thickness that is preferably smaller than the remainder of the body 86. The overhang portion 106 presents a preferably straight outermost edge 108 for engaging the central cam 56 as will be discussed. But it is also within the ambit of the present invention where the edge 108 is arcuate or is otherwise non-straight. Adjacent the distal end 96, the body 86 presents an arcuate edge 110 that includes a circumferentially extending groove 112.

The illustrated blade chuck 24 preferably includes six (6) jaws 54. But the principles of the present invention are also applicable where there are a smaller or larger number of jaws 54. Furthermore, the number of jaws 54 could be different from the number of spokes 60 without departing from the scope of the present invention.

The shiftable jaw 54 is preferably slidably received on the chassis 52 by extending a corresponding one of the spokes 60 into the slot 100, with the proximal end 94 being positioned closer to the hub 58 than the distal end 96. However, the principles of the present invention are also applicable where the shiftable jaw 54 moves relative to the chassis 52 in another manner, e.g., by pivoting relative to the chassis 52 about an axis orthogonal to the hub axis and orthogonal to the slot axis. Moreover, it is equally consistent with the principles of the present invention where the jaw 54 is attached to the chassis 52 but is flexible relative to the chassis 52 to secure the blades B1,B2. The jaws 54 are also preferably positioned so that the upper sides 90 are coplanar. But it is also within the ambit of the present invention where the upper sides 90 are offset from one another along the hub axis.

Figure 10:
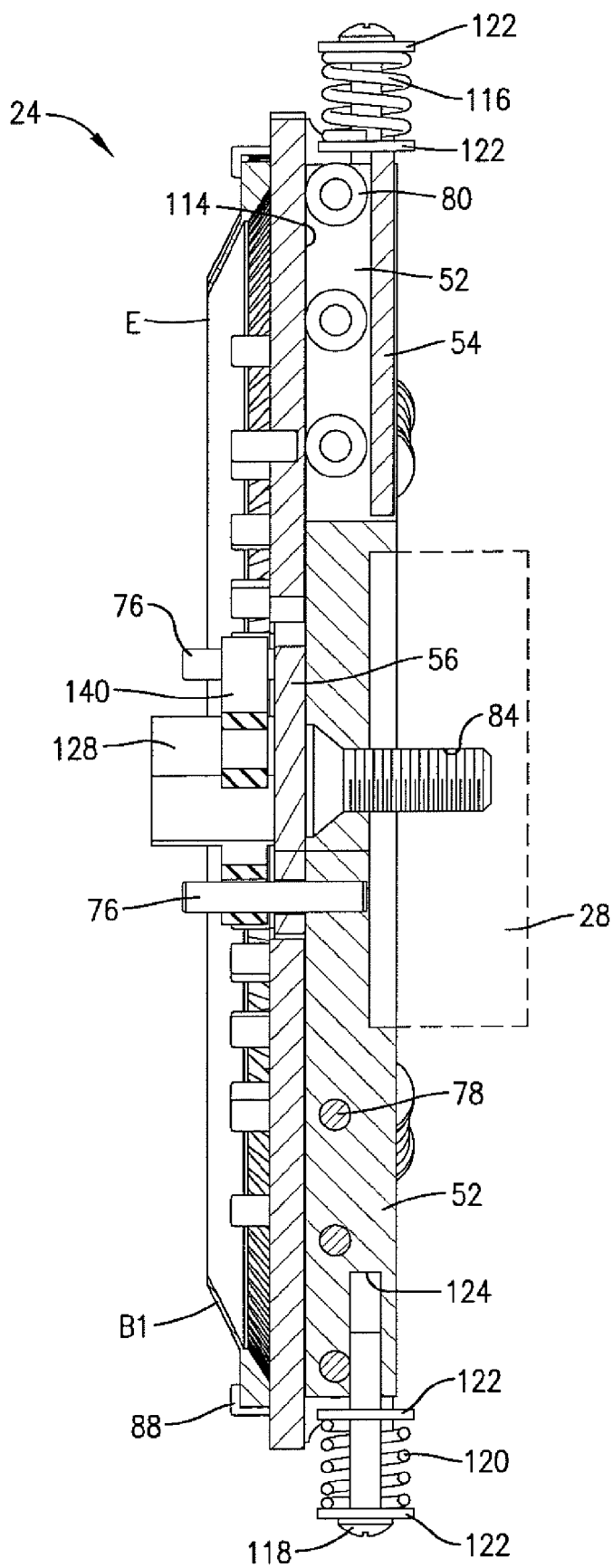
FIG. 10 is a cross-sectional view taken along line 10-10 in FIG. 9.
Figure 11:
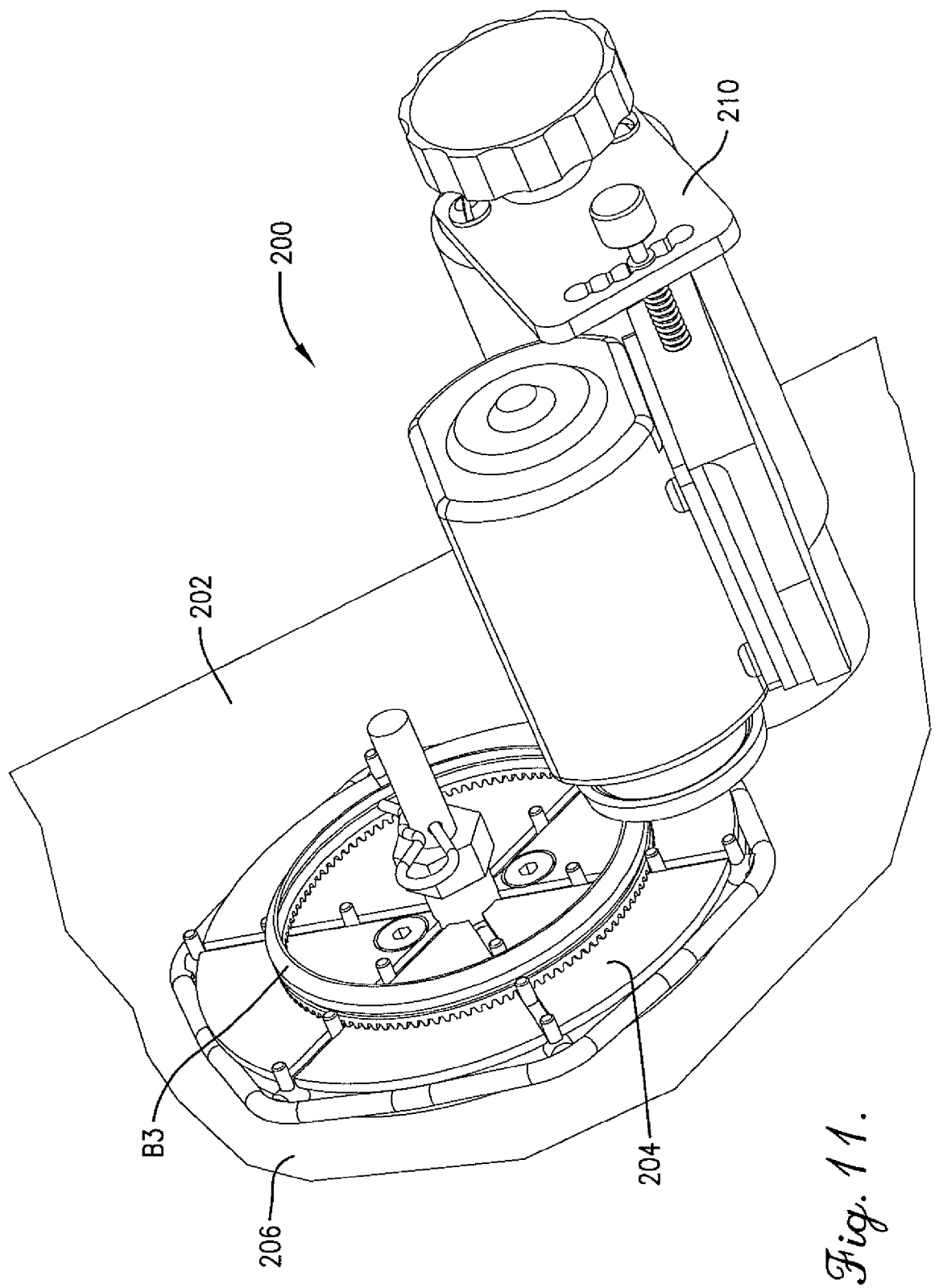
FIG. 11 is a fragmentary perspective view of a blade-sharpening machine constructed in accordance with a second preferred embodiment of the present invention.
Figure 12:
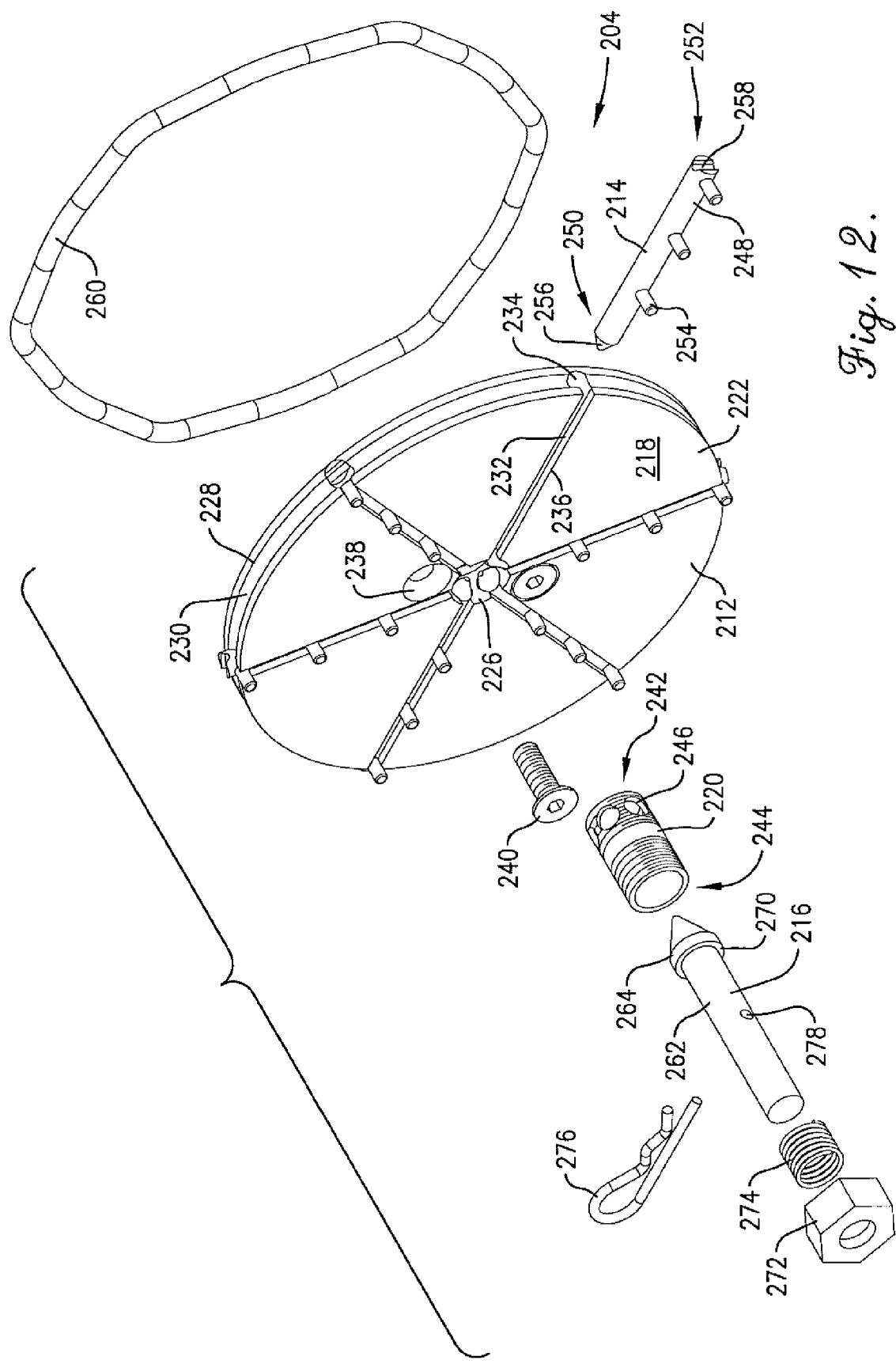
FIG. 12 is an exploded view of a blade-holding chuck shown in FIG. 11.
Figure 13:
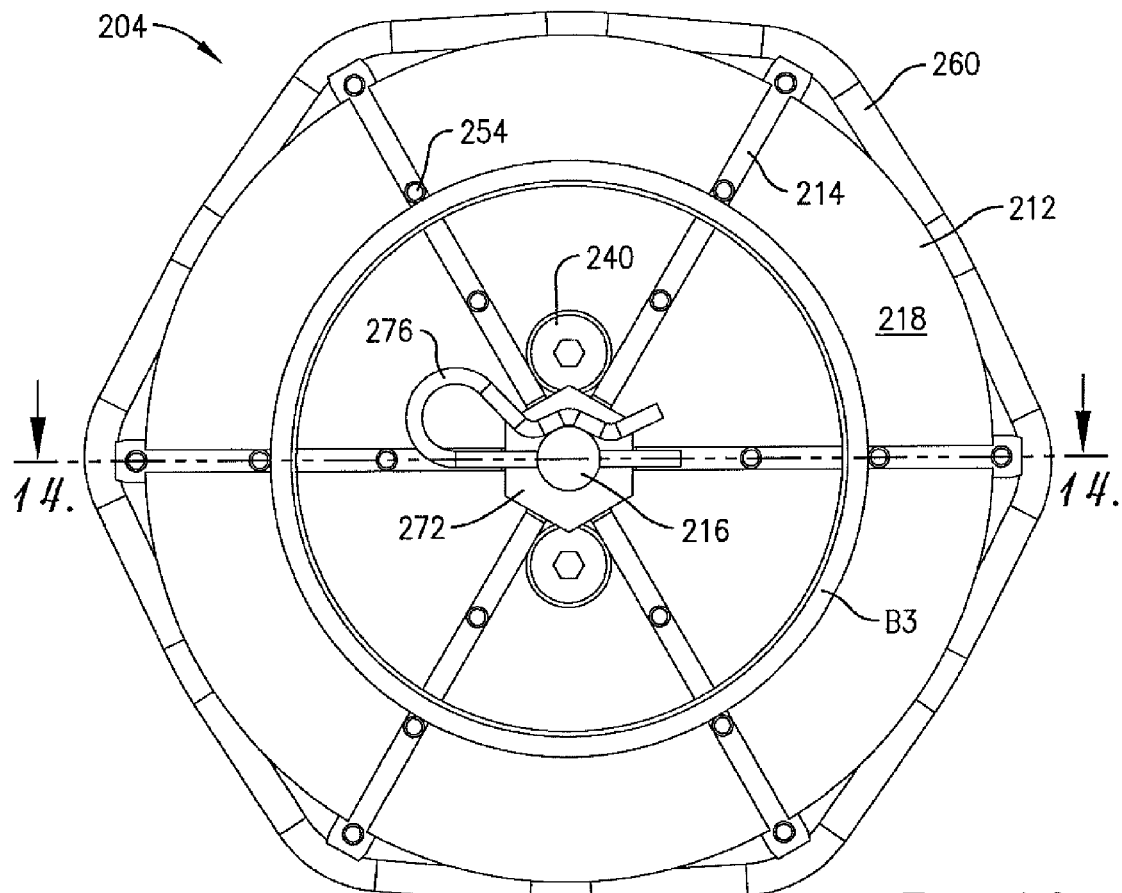
FIG. 13 is a top view of the blade-holding chuck shown in FIGS. 11 and 12, with the chuck being in a blade-securing condition and including jaws with blade holding elements that cooperatively form concentric blade-retaining sections of the chuck, and with a radially intermediate blade-retaining section securing the blade.
Figure 14:
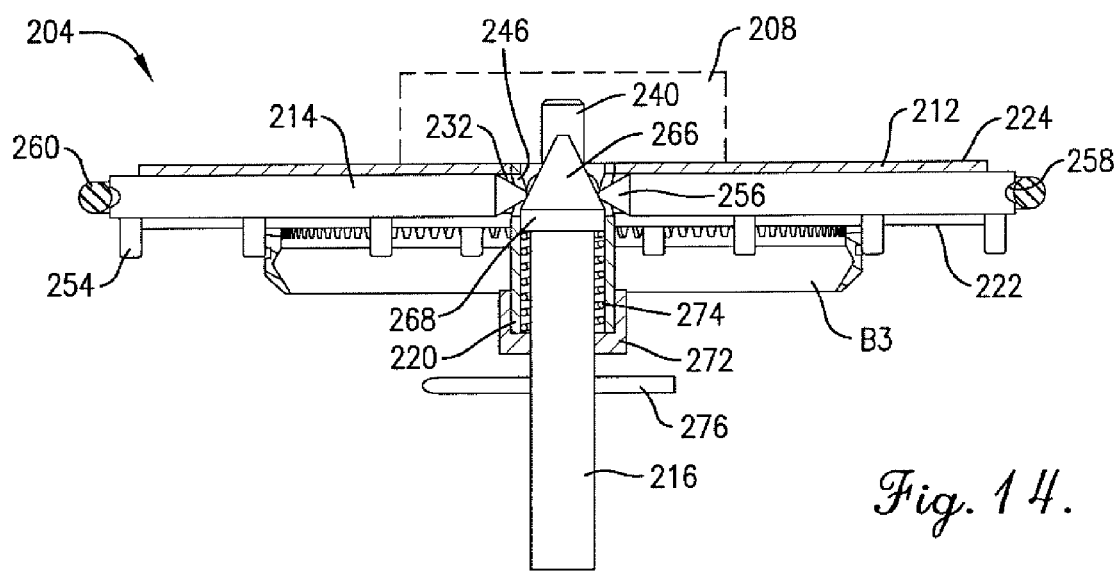
FIG. 14 is a cross-sectional view taken along line 14-14 in FIG. 13.
Figure 15:
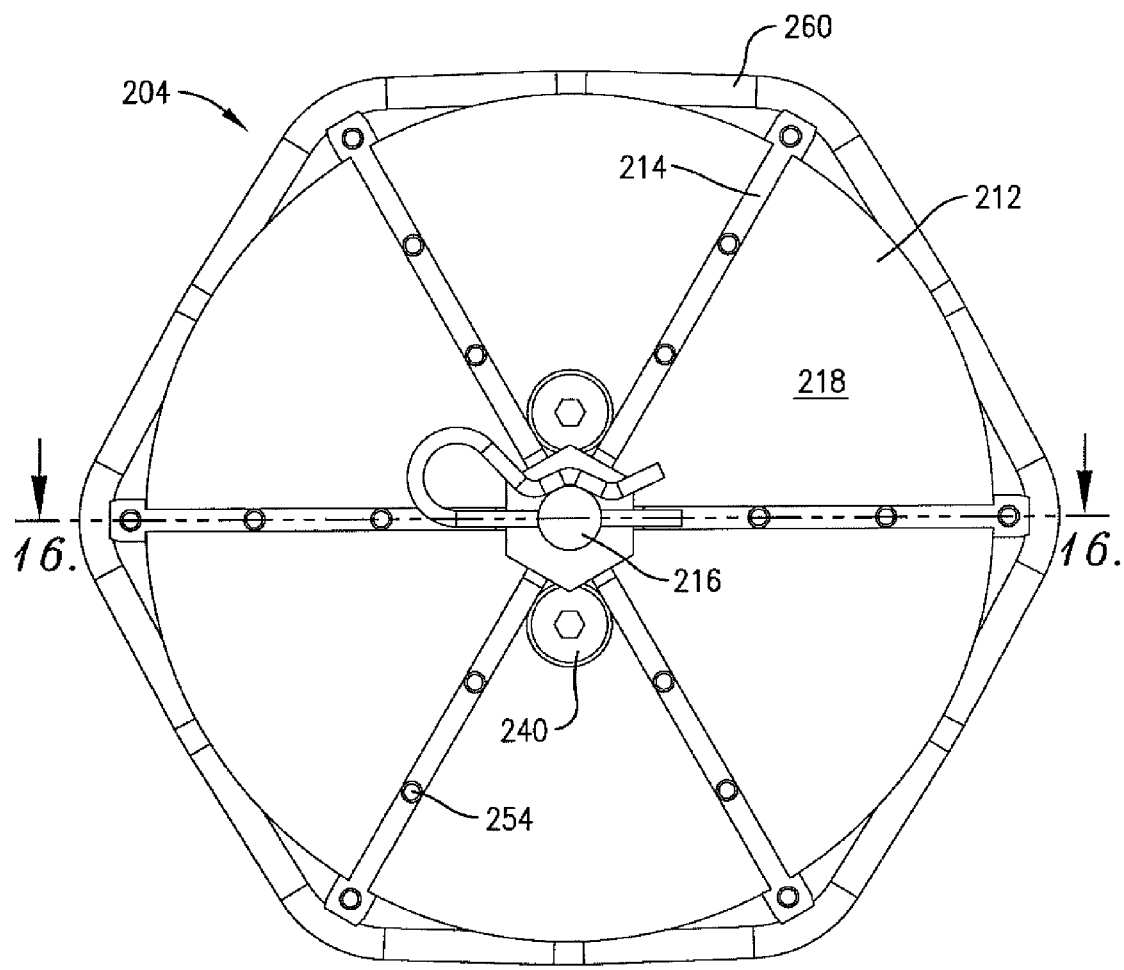
FIG. 15 is a top view of the blade-holding chuck shown in FIGS. 11-14, showing the chuck in a blade-releasing condition, with the blade removed from the chuck.
Figure 16:
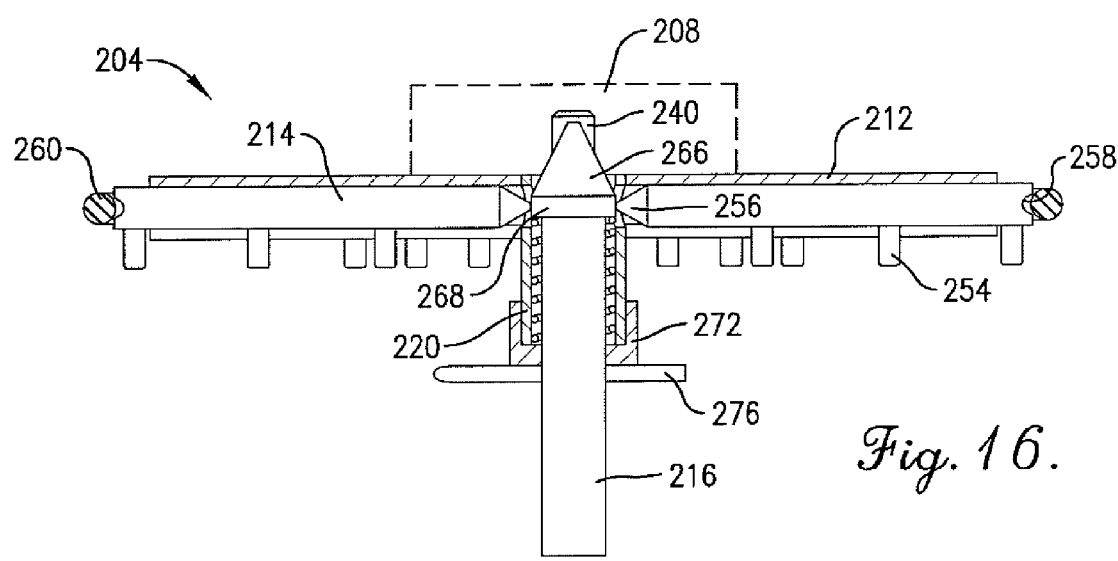
FIG. 16 is a cross-sectional view taken along line 16-16 in FIG. 15.

The rollers 80 rotatably engage an interior surface 114 presented by the slot 100 (see FIG. 10). In this manner, the chassis 52, rollers 80, and body 86 cooperatively provide a roller bearing so that the jaw 54 slides smoothly relative to the chassis 52. While this bearing configuration between the chassis 52 and body 86 is preferred for providing relative sliding movement, it is also within the ambit of the present invention where another bearing configuration is used, such as a linear journal bearing.

Each jaw 54 preferably includes ten (10) blade-locating bosses 88 that project a length from the upper side 90. The length of bosses 88 is preferably less than a thickness presented by the blades B1,B2 so that the bosses 88 do not interfere with blade sharpening. In other words, the bosses 88 are preferably axially spaced below a blade edge E of the blade to be sharpened (see FIG. 10) so that the bosses 88 are not inadvertently engaged by the grinding wheel 50. The bosses 88 are preferably cylindrically shaped, but it is consistent with the principles of the present invention where the bosses 88 are alternatively shaped, e.g., the bosses 88 could be elongated to extend arcuately along the upper side 90. The bosses 88 are preferably arranged in two rows that diverge from the proximal end 94 to the distal end 96, with each row having five (5) bosses 88. The bosses 88 also form five (5)

pairs of bosses 88, with each pair having two bosses 88 that are uniformly spaced from the proximal end 94. In this manner, the bosses 88 of the various jaws 54 are concentrically aligned so that the blade chuck 24 is operable to accommodate a variety of blade sizes, as will be discussed in greater detail. However, the principles of the present invention are applicable where the bosses 88 have an alternative arrangement, e.g., where a single row of bosses 88 are presented or where more than two rows of bosses 88 are presented.

As will be discussed in greater detail, the blade chuck 24 includes structure so that the jaws 54 are preferably equally radially positioned relative to the hub axis, with the bosses 88 cooperatively forming concentric blade-retaining sections of the blade chuck 24. Specifically, each blade-retaining section is preferably cooperatively formed by twelve (12) bosses 88 that are about equally radially spaced from the hub axis and are circumferentially spaced from one another, i.e., the blade-retaining sections preferably define locations along a circular path. For example, a radially outermost one of the blade-retaining sections is configured to secure blade B1 (see FIG. 1) while a radially intermediately spaced one of the blade-retaining sections is configured to secure blade B2 (see FIG. 4). In this manner, the blade-retaining sections are configured so that the blade chuck 24 can secure multiple sizes of blades.

Again, each blade-retaining section is defined by twelve (12) bosses 88 that encircle the hub axis, with each jaw 54 carrying two of the bosses 88. However, the principles of the present invention are also applicable where each of the blade-retaining sections include the same number of bosses 88, but where that number is different from the illustrated embodiment, e.g., where each section includes six (6) bosses 88. Furthermore, one or more of the blade-retaining sections could include a different number of bosses 88 from the remaining blade-retaining sections without departing from the scope of the present invention. For example, the blade-retaining section having the smallest diameter could include a smaller number of bosses 88 than the blade-retaining section having the largest diameter. Yet further, the jaws 54 could present one or more blade-retaining sections while being entirely devoid of bosses 88. For example, the upper side 90 of each jaw 54 could include one or more laterally-extending corrugations, with the corrugations cooperatively forming a blade-retaining section.

The bosses 88 could also be alternatively configured to present the blade-retaining sections consistent with the principles of the present invention. While the bosses 88 are preferably shaped and configured to hold the blades B1,B2 along radially innermost surface portions of the bosses 88 relative to the hub axis, i.e., where the blade-retaining section holding the blade is positioned radially outwardly from the blade, the principles of the present invention are applicable where the bosses 88 secure the blades B1,B2 along another surface portion. For example, a radially outermost surface portion of the bosses 88 relative to the hub axis could be used to secure the blade, i.e., where the blade-retaining section holding the blade is positioned radially inwardly from the blade.

As shown in the illustrated embodiment, the blade-retaining sections define locations along circular paths, with the sections, and therefore the paths, preferably being concentrically arranged relative to one another and being centered about the hub axis. However, for some aspects of the present invention it is consistent with the principles of the present invention where the blade-retaining sections are alternatively positioned relative to one another, e.g., non-concentrically. The illustrated sections are also spaced apart from one another in the radial direction with a different radial spacing between each pair of adjacent sections. But the sections could be differently spaced relative to each other, e.g., where each pair of adjacent sections present a substantially identical radial spacing, without departing from the scope of the present invention.

The blade chuck 24 further includes fasteners 116 that are associated with respective ones of the jaws 54 and which position the jaws 54 relative to the chassis 52. The illustrated fastener 116 includes a threaded machine screw 118, a spring 120 received on the screw 118, and flat washers 122 also received on the screw 118 on opposite sides of the spring 120. The screw 118 is threaded into a hole 124 presented by an outermost end of the corresponding spoke 60. The fastener 116 is attached to the chassis 52 so that one of the flat washers 122 engages the jaw 54 (see FIG. 10), another of the flat washers 122 engages the screw head, and the spring 120 is positioned between the washers 122 to urge the washers 122 apart from one another when the spring 120 is compressed.

The fastener 116 preferably encourages the jaw 54 radially inwardly toward the hub 58, while permitting limited sliding movement along the radial direction. In the illustrated embodiment, the fasteners 116 encourage the jaws 54 radially inwardly to cooperatively hold the blade within a corresponding blade-retaining section, e.g., blade B1 is held by the radially outermost blade-retaining section. However, the principles of the present invention are equally applicable where the fasteners 116 encourage the jaws 54 radially outwardly, e.g., to hold the blade in a retaining section where the retaining section is radially inwardly positioned relative to the blade. The fasteners 116 also preferably position the jaws 54 so that the jaws 54 are substantially equally radially spaced from the hub axis while holding one of the blades B1,B2 as discussed above. But one or more of the jaws 54 could be radially spaced from the hub axis at a distance different from the other jaws 54 to hold a blade without departing from the scope of the present invention.

While the illustrated blade chuck 24 preferably uses the spring-loaded fasteners 116 to encourage the jaws 54 into engagement with any one of variously sized blades, the principles of the present invention are equally applicable where the blade chuck includes another mechanism for securing and holding the jaws 54 in blade engagement. For example, the blade chuck 24 could include a manually-engageable connector, such as a rigidly interconnecting screw or pin, that selectively fixes the chassis 52 and jaw 54 to one another.

The cam 56 includes a cam plate 126, a hex head 128 integrally formed with the cam plate 126, and two pins 130 attached to the cam plate 126. The cam plate 126 preferably includes an endless outermost surface 132 with six (6) surface segments 134 that cooperatively form a hexagonal shape. While the segments 134 are preferably substantially straight, the principles of the present invention are applicable where the segments 134 are arcuate or have an otherwise alternative shape. The cam plate 126 also presents a pair of arcuate slotted holes 136. The cam 56 further presents a bore 138 that extends through the cam plate 126 and the hex head 128.

The cam 56 is rotatably connected to the chassis 52 by positioning the pin 74 within the bore 138. Again, the offset pins 76 are attached to the hub 58, with the pins 76 extending through respective ones of the slotted holes 136 to restrict relative pivotal movement between the hub 58 and the cam 56. The surface segments 134 are spaced adjacent the corresponding jaws 54. The blade chuck 24 further includes a pair of endless spring bands 140. Each of the bands 140 are positioned around corresponding ones of the pins 76,130 so that the bands 140 urge the cam 56 to rotate counterclockwise as will be discussed further. While the illustrated blade chuck 24 preferably includes bands 140 for urging the cam 56 to rotate, it is also within the ambit of the present invention to use other spring-type mechanisms, such as a torsion spring.

The cam 56 is configured to shift the jaws 54 in a radial direction by rotating about the central pin 74. With the blades B1,B2 being removed from the blade chuck 24, the fasteners 116 normally urge the jaws 54 and the cam 56 into a retracted condition, where the overhang portion 106 covers part of the upper side 62 of the hub 58. In the retracted condition, the segments 134 are in substantially flush contact with the edges 108 of the overhang portions 106 and the jaws 54 are located in a radially innermost position (see FIG. 7). The cam 56 is preferably rotatable counterclockwise out of the retracted condition and against the bias of the fasteners 116 to shift the jaws 54 in a radially outward direction (see FIG. 8). Thus, the segments 134 serve as cam surfaces as the cam 56 is rotated relative to the jaws 54, with the edges 108 serving as follower surfaces. As discussed previously, the illustrated edges 108 and segments 134 could have alternative shapes, e.g., the edges 108 and segments 134 could include arcuate features for providing an alternative cam action. Furthermore, the edges 108 and segments 134 could present different shapes or could be different in number, e.g., where the edges 108 and segments 134 are not flush in the retracted condition.

As the blade chuck 24 secures the blade B1 (see FIG. 9), the jaws 54 are spaced apart from the cam 56 when the cam 56 is in the retracted condition. But the bands 140 urge the cam 56 to rotate counterclockwise into engagement with each of the jaws 54. In this manner, the bands 140 and cam 56 cooperatively encourage the jaws 54, the blade-retaining sections, and, consequently, the blades B1,B2 into a substantially centered position relative to the hub axis. However, the principles of the present invention are applicable where a mechanism other than the bands 140 is used to hold the cam 56 into engagement with the jaws 54. For example, a manually-engageable connector, such as a screw or pin, could be used to fix the cam 56 relative to the chassis 52. Preferably, the spring force generated by the fasteners 116 overcomes the spring force generated by the bands 140 so that the jaws 54 are normally encouraged to shift radially inward to engage the blade. However, it is also consistent with the principles of the present invention where the force of the bands 140 normally overcomes the force of the fasteners 116, i.e., where the jaws 54 are normally biased radially outwardly by the combination of fasteners 116 and bands 140.

Preferably, the cam 56 and the fasteners 116 cooperatively engage each of the jaws 54 to shift the jaws 54 substantially at the same time along the radial direction when cam rotation is initiated. Furthermore, the jaws 54 preferably move substantially the same distance and speed as the cam 56 rotates. In this manner, the blade-retaining sections become larger or smaller depending on the direction of cam rotation, but the sections generally do not change in geometric shape. Again, the bands 140 also encourage the jaws 54 to remain evenly radially spaced from the hub axis as the jaws 54 shift, with the sections also remaining generally concentric to one another. However, the principles of the present invention are applicable where one or more jaws 54 shift at a different time relative to other jaws 54 or shift a different distance or speed relative to the other jaws 54.

While the illustrated spring-loaded cam mechanism of the blade chuck 24 is preferred for shifting the jaws 54 into and out of engagement with the blades B1,B2, it is within the scope of the present invention for the blade chuck 24 to include an alternative mechanism for shifting the jaws 54. For instance, the jaws 54 could be shiftably interconnected with a rotatable input shaft by a gear drive, e.g., where the blade chuck 24 includes a rotatable scroll gear and the jaws 54 include teeth, with the scroll gear rotatably engaging the teeth to shift the jaws 54.

In operation, the motor 48 is pivoted out of the blade sharpening position to permit installation of the blade B1 or blade B2 onto the machine 20. The blade B1 is secured in the blade chuck 24 by rotating the cam 56 counterclockwise to shift the jaws 54 out of the retracted condition (see FIG. 7) and into a radially outermost extended condition (see FIG. 8). The blade B1 is placed in a centered position on the blade chuck 24, with the blade B1 engaging the jaws 54 and the blade edge E spaced apart from the jaws 54 (see FIG. 10). With the spring-loaded fasteners 116 urging the jaws 54 radially inwardly, the cam 56 can simply be released to allow the jaws 54 to shift into engagement with and secure the blade B1 (see FIG. 9). The motor 48 is operable to be pivoted into the blade sharpening position relative to the blade B1 where the grinding wheel 50 contacts the blade edge E (see FIG. 2). Again, the blade chuck 24 can be rotated while the motor 48 is simultaneously rotating to sharpen the entire blade edge E.

The blade B1 is removed from the machine 20 by initially pivoting the motor 48 out of the blade sharpening position. The cam 56 is rotatable counterclockwise to shift the jaws 54 out of engagement (see FIG. 9) with the blade B1 and into the extended condition (see FIG. 8). The blade B1 is then freely removable from the blade chuck 24 and the cam 56 can be released to allow the jaws 54 to return to the retracted condition (see FIG. 7).

Turning to FIGS. 11-16, a second preferred embodiment of the present invention is depicted. For the sake of brevity, the remaining description will focus primarily on the differences of this embodiment from the preferred embodiment described above.

An alternative blade sharpening machine 200 broadly includes a drive unit 202 and an alternative blade chuck 204. The drive unit 202 includes a base 206, a rotatable platform 208, and a sharpening assembly 210 mounted on the base 206.

The blade chuck 204 broadly includes, among other things, a chassis 212, shiftable jaws 214, and a central cam 216. The chassis 212 includes a hub 218 and a threaded sleeve 220. The hub 218 preferably presents a round disc-like shape, with upper and lower sides 222,224, a central bore 226, and an outermost circumferential surface 228 that presents an annular groove 230. The hub 218 further presents six (6) radial slots 232 that extend radially from the bore 226 to the surface 228. The slots 232 include a cylindrical portion 234 spaced between the sides 222,224 and a straight portion that presents an open face 236 along the upper side 222. The slots 232 are preferably evenly spaced apart from one another along a circumferential direction. The hub 218 also presents countersunk holes 238 that extend from the upper side 222 to the lower side 224. Similar to the previous embodiment, the hub 218 is attached to the platform 208 by extending flat-head screws 240 through the holes 238 and into threaded holes in the platform 208.

The threaded sleeve 220 includes threaded ends 242,244 and holes 246 circumferentially spaced about the threaded end 242. The sleeve 220 is threaded into the central bore 226, with the holes 246 being substantially aligned with the slots 232 (see FIGS. 14 and 16).

The shiftable jaws 214 each preferably include a cylindrical body 248 with proximal and distal ends 250,252 and locating bosses 254 spaced along the length of the body 248. The body 248 presents a substantially conical follower surface 256 adjacent the proximal end 250 and an outermost grooved surface 258 adjacent the distal end 252. The jaws 214 are received in corresponding ones of the slots 232 with the proximal ends 250 spaced adjacent the central bore 226 and extending through respective ones of the holes 246. Furthermore, the bosses 254 extend out of the slots 232 and through corresponding ones of the open faces 236 to project above the upper side 222. The jaws 214 are freely slidable within the corresponding slot 232. As in the previous embodiment, the locating bosses 254 cooperatively form a plurality of concentrically arranged blade-retaining sections.

The blade chuck 204 further includes an endless elastomeric band 260 that is stretched to be received in the annular groove 230 and engages each of the grooved surfaces 258. The band 260 serves as a fastener by urging the jaws 214 radially inwardly and permits limited radial movement of the jaws 214 from a radially innermost retracted condition (not shown) to a radially outermost extended condition (see FIGS. 15 and 16). While the illustrated band 260 is preferably exposed when installed on the jaws 214, the band 260 could also be housed in an enclosing structure of the blade chuck 204 without departing from the scope of the present invention.

The central cam 216 includes a cylindrical rod 262 that presents a cam surface 264 with an endmost conical section 266 and a cylindrical section 268 that ends at an annular ledge 270. The cam 216 is slidably received in the sleeve 220 and is held therein by a nut 272 that is threaded onto the threaded end 244. A spring 274 is spaced between the annular ledge 270 and the nut 272 and urges the cam 216 to slide into engagement jaws 214. A cotter pin 276 is attached to the cam 216 by extending through a hole 278 therein. The cotter pin 276 and nut 272 cooperatively limit sliding movement of the cam 216 relative to the sleeve 220. Specifically, the cotter pin 276 engages the nut 272 to limit sliding movement into the sleeve (see FIG. 16) and the nut 272 and spring 274 cooperatively engage the ledge 270 to restrict sliding movement out of the sleeve 220 (see FIG. 14).

Turning to FIGS. 13-16, the cam 216 is slidable between the retracted and extended conditions. Similar to the previous embodiment, the cam 216 and the band 260 cooperatively engage each of the jaws 214 to shift the jaws 214 substantially at the same time along the radial direction when cam movement is initiated. Also, the jaws 214 move substantially the same distance and speed as the cam 216 shifts. Similar to the previous embodiment, the blade-retaining sections become larger or smaller depending on the direction of cam movement, but the sections generally do not change in geometric shape.

Sliding movement of the cam 216 from the retracted condition and toward the jaws 214, i.e., pushing the cam 216 into the chassis 212, results in the follower surfaces 256 sliding along the cam surface 264 and pushes the jaws 214 radially outwardly. Specifically, the follower surfaces 256 move from the conical section 266 to the cylindrical section 268 until the cotter pin 276 engages the nut 272 to restrict further movement (see FIGS. 15 and 16). When positioned in engagement with the cylindrical section 268, the jaws 214 cannot urge the cam 216 toward the retracted condition. But the jaws 214 do urge the cam 216 toward the retracted condition when in engagement with the conical section 266. In this manner, a user can retain the jaws 214 in the radially outermost extended condition without applying a force to the cam 216.

In the extended condition, a blade B3 is operable to be positioned on the chassis 212 and retained by an intermediately spaced one of the blade-retaining sections. The jaws 214 are operable to engage and secure the blade B3 when the cam 216 is released, i.e., by sliding the cam 216 so that the jaws 214 engage the conical section 266 instead of the cylindrical section 268 (see FIGS. 13 and 14). Preferably, the spring force of the band 260 overcomes the spring force of the spring 274 so that the jaws 214 are urged to slide radially inwardly into engagement with the blade B3, with the jaws 214 and the blade-retaining sections remaining uniformly radially spaced from the hub axis. Consequently, cam surface 264 follows the jaws 214, with the cam 216 being urged to slide away from the jaws 214 toward the retracted condition. Removal of the blade B3 from the blade chuck 204 occurs in a similar fashion by pushing the cam 216 inwardly to expand the jaws 214. Again, the jaws 214 retract by releasing the cam 216.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A universal blade-holding chuck operable to be rotatably driven by a blade-sharpening drive having an adjustable blade sharpener, said universal blade-holding chuck configured to securely hold any one of multiple variously sized circular blades while the blade is sharpened by the adjustable blade sharpener, said universal blade-holding chuck comprising:
 a chassis operable to be rotated by the drive and rotatable about a rotation axis;
 a plurality of discrete blade-holding jaws circumferentially positioned about the rotation axis and slidably coupled relative to the chassis for sliding movement in a radial direction relative to the rotation axis;
 a jaw-positioning element shiftably mounted relative to the chassis,
 said jaw-positioning element being operably coupled with each of the plurality of discrete blade-holding jaws to shift the jaws simultaneously along the radial direction when the jaw-positioning element is shifted relative to the chassis,
 said jaws cooperatively presenting a plurality of concentrically arranged blade-retaining sections, with each of the sections being configured to engage a respective one of the circular blades; and
 a spring mechanism interconnecting the chassis and the plurality of discrete blade-holding jaws to urge the jaws in the radial direction and into engagement with the blade held during sharpening.

2. The universal blade-holding chuck as claimed in claim 1, said spring mechanism urging the jaws radially inwardly, said spring mechanism comprising a plurality of springs, with each of the springs engaging a corresponding one of the jaws.

3. The universal blade-holding chuck as claimed in claim 1, said spring mechanism urging the jaws radially inwardly, said spring mechanism comprising an endless spring that engages each of the jaws,
 said endless spring being elastomeric.

4. The universal blade-holding chuck as claimed in claim 1, said jaw-positioning element comprising a cam that shiftably engages the jaws to shift the jaws in the radial direction; and
 a cam spring interconnecting the cam and the chassis to urge the cam to shift against the jaws and act against any force applied to the jaws by the spring mechanism to keep the jaws generally centered relative to the chassis.

5. The universal blade-holding chuck as claimed in claim 1,
said chassis including a hub and a plurality of spokes extending radially outwardly from the hub and spaced circumferentially about the hub,
each of said plurality of discrete blade-holding jaws being slidably received on a respective one of the plurality of spokes,
said chassis including a plurality of rollers,
each of said plurality of spokes being associated with at least one of the rollers, with each of the jaws and the chassis cooperatively forming a roller bearing therebetween.

6. The universal blade-holding chuck as claimed in claim 1,
said chassis presenting a plurality of bores that extend radially outwardly from the rotation axis,
each of said plurality of discrete blade-holding jaws being slidably received in a corresponding one of the bores.

7. The universal blade-holding chuck as claimed in claim 1,
said jaw-positioning element comprising a cam presenting a radially outwardly facing cam surface,
said jaws each presenting radially inwardly facing follower surfaces that engage the cam surface, with cam movement relative to the chassis causing progressive radial movement of the jaws.

8. A universal blade-sharpening machine operable to securely hold and sharpen any one of multiple variously sized circular blades, said universal blade-sharpening machine comprising:
a blade-sharpening drive having an adjustable blade sharpener; and
a universal blade-holding chuck rotatably powered by the drive and configured to securely hold the blade that is held during sharpening by the adjustable blade sharpener,
said universal blade-holding chuck including a chassis, a plurality of discrete blade-holding jaws, a jaw-positioning element, and a spring mechanism,
said chassis being drivingly connected with the drive and rotatable about a rotation axis,
said plurality of discrete blade-holding jaws circumferentially positioned about the rotation axis and slidably coupled relative to the chassis for sliding movement in a radial direction relative to the rotation axis,
said jaw-positioning element shiftably mounted relative to the chassis,
said jaw-positioning element being operably coupled with each of the plurality of discrete blade-holding jaws to shift the jaws simultaneously along the radial direction when the jaw-positioning element is shifted relative to the chassis,
said jaws cooperatively presenting a plurality of concentrically arranged blade-retaining sections, with each of the sections being configured to engage a respective one of the circular blades,
said spring mechanism interconnecting the chassis and the plurality of discrete blade-holding jaws to urge the jaws in the radial direction and into engagement with the blade held during sharpening.

9. The universal blade-sharpening machine as claimed in claim 8,
said spring mechanism urging the jaws radially inwardly,
said spring mechanism comprising a plurality of springs, with each of the springs engaging a corresponding one of the jaws.

10. The universal blade-sharpening machine as claimed in claim 8,
said spring mechanism urging the jaws radially inwardly,
said spring mechanism comprising an endless spring that engages each of the jaws,
said endless spring being elastomeric.

11. The universal blade-sharpening machine as claimed in claim 8,
said jaw-positioning element comprising a cam that shiftably engages the jaws to shift the jaws in the radial direction,
said universal blade-holding chuck further including a cam spring that interconnects the cam and the chassis to urge the cam to shift against the jaws and act against any force applied to the jaws by the spring mechanism to keep the jaws generally centered relative to the chassis.

12. The universal blade-sharpening machine as claimed in claim 8,
said chassis including a hub and a plurality of spokes extending radially outwardly from the hub and spaced circumferentially about the hub,
each of said plurality of discrete blade-holding jaws being slidably received on a respective one of the plurality of spokes,
said chassis including a plurality of rollers,
each of said plurality of spokes being associated with at least one of the rollers, with each of the jaws and the chassis cooperatively forming a roller bearing therebetween.

13. The universal blade-sharpening machine as claimed in claim 8,
said chassis presenting a plurality of bores that extend radially outwardly from the rotation axis,
each of said plurality of discrete blade-holding jaws being slidably received in a corresponding one of the bores.

14. The universal blade-sharpening machine as claimed in claim 8,
said jaw-positioning element comprising a cam presenting a radially outwardly facing cam surface,
said jaws each presenting radially inwardly facing follower surfaces that engage the cam surface, with cam movement relative to the chassis causing progressive radial movement of the jaws.

15. A universal blade-holding chuck operable to be rotatably driven by a blade-sharpening drive having an adjustable blade sharpener, said universal blade-holding chuck configured to securely hold any one of multiple variously sized circular blades while the blade is sharpened by the adjustable blade sharpener, said universal blade-holding chuck comprising:
a chassis operable to be rotated by the drive and rotatable about a rotation axis;
a plurality of discrete blade-holding jaws circumferentially positioned about the rotation axis and slidably coupled relative to the chassis for sliding movement in a radial direction relative to the rotation axis,
said jaws cooperatively presenting a plurality of concentrically arranged blade-retaining sections, with each of the sections being configured to engage a respective one of the circular blades; and
a cam shiftably mounted relative to the chassis and presenting a radially outwardly facing cam surface,
said jaws each presenting radially inwardly facing follower surfaces that engage the cam surface, with cam movement relative to the chassis causing progressive radial movement of the jaws.

16. The universal blade-holding chuck as claimed in claim 15,
- said earn being rotatably mounted relative to the chassis,
- said jaws being slidable between a blade-securing condition and a blade-releasing condition,
- said cam rotating less than one-quarter of a turn to shift the jaws from one of the conditions to the other.

17. The universal blade-holding chuck as claimed in claim 15,
- said cam being slidably mounted relative to the chassis,
- said cam being slidable along a direction substantially parallel to the rotation axis.

18. The universal blade-holding chuck as claimed in claim 15,
- said chassis including a hub and a plurality of spokes extending radially outwardly from the hub and spaced circumferentially about the hub,
- each of said plurality of discrete blade-holding jaws being slidably received on a respective one of the plurality of spokes,
- said chassis including a plurality of rollers,
- each of said plurality of spokes being associated with at least one of the rollers, with each of the jaws and the chassis cooperatively forming a roller bearing therebetween.

19. The universal blade-holding chuck as claimed in claim 15,
- said chassis presenting a plurality of bores that extend radially outwardly from the rotation axis,
- each of said plurality of discrete blade-holding jaws being slidably received in a corresponding one of the bores.

20. A universal blade-sharpening machine operable to securely hold and sharpen any one of multiple variously sized circular blades, said universal blade-sharpening machine comprising:
- a blade-sharpening drive having an adjustable blade sharpener; and
- a universal blade-holding chuck rotatably powered by the drive and configured to securely hold the blade that is held during sharpening by the adjustable blade sharpener,
- said universal blade-holding chuck including a chassis, a plurality of discrete blade-holding jaws, and a cam,
- said chassis being drivingly connected with the drive and rotatable about a rotation axis,
- said plurality of discrete blade-holding jaws circumferentially positioned about the rotation axis and slidably coupled relative to the chassis for sliding movement in a radial direction relative to the rotation axis,
- said jaws cooperatively presenting a plurality of concentrically arranged blade-retaining sections, with each of the sections being configured to engage a respective one of the circular blades,
- said cam shiftably mounted relative to the chassis and presenting a radially outwardly facing cam surface,
- said jaws each presenting radially inwardly facing follower surfaces that engage the cam surface, with cam movement relative to the chassis causing progressive radial movement of the jaws.

21. The universal blade-sharpening machine as claimed in claim 20,
- said cam being rotatably mounted relative to the chassis,
- said jaws being slidable between a blade-securing condition and a blade-releasing condition,
- said cam rotating less than one-quarter of a turn to shift the jaws from one of the conditions to the other.

22. The universal blade-sharpening machine as claimed in claim 20,
- said cam being slidably mounted relative to the chassis,
- said cam being slidable along a direction substantially parallel to the rotation axis.

23. The universal blade-sharpening machine as claimed in claim 20,
- said chassis including a hub and a plurality of spokes extending radially outwardly from the hub and spaced circumferentially about the hub,
- each of said plurality of discrete blade-holding jaws being slidably received on a respective one of the plurality of spokes,
- said chassis including a plurality of rollers,
- each of said plurality of spokes being associated with at least one of the rollers, with each of the jaws and the chassis cooperatively forming a roller bearing therebetween.

24. The universal blade-sharpening machine as claimed in claim 20,
- said chassis presenting a plurality of bores that extend radially outwardly from the rotation axis,
- each of said plurality of discrete blade-holding jaws being slidably received in a corresponding one of the bores.

* * * * *